(12) United States Patent
Fujiwara et al.

(10) Patent No.: US 6,478,119 B2
(45) Date of Patent: Nov. 12, 2002

(54) BRAKE PAD WEAR DETECTING APPARATUS

(75) Inventors: Tadasuke Fujiwara, Tokyo (JP); Yoshiyuki Mori, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/985,944

(22) Filed: Nov. 6, 2001

(65) Prior Publication Data

US 2002/0060109 A1 May 23, 2002

(30) Foreign Application Priority Data

Nov. 7, 2000 (JP) ........................................ 2000-339183

(51) Int. Cl.$^7$ ............................................... F16D 66/00
(52) U.S. Cl. ................................................. 188/1.11 W
(58) Field of Search ........................ 188/1.11 W, 1.11 L

(56) References Cited

U.S. PATENT DOCUMENTS

| | | | | | |
|---|---|---|---|---|---|
| 4,016,533 A | * | 4/1977 | Ishikawa et al. | ......... | 188/1.11 L |
| 4,274,511 A | * | 6/1981 | Moriya | ..................... | 188/1.11 L |
| 4,391,350 A | * | 7/1983 | Moriya | ........................ | 116/208 |
| 4,562,421 A | * | 12/1985 | Duffy | ....................... | 188/1.11 L |
| 5,454,450 A | * | 10/1995 | Tanigawa | ................. | 188/1.11 L |
| 5,839,545 A | * | 11/1998 | Preston et al. | ........... | 188/1.11 L |
| 6,193,020 B1 | * | 2/2001 | Takanashi et al. | ....... | 188/1.11 L |
| 6,290,027 B1 | * | 9/2001 | Matsuzaki | .............. | 188/1.11 E |
| 6,357,290 B1 | * | 3/2002 | Asao et al. | ..................... | 33/610 |

FOREIGN PATENT DOCUMENTS

JP     58-42665 Y2     9/1983

* cited by examiner

Primary Examiner—Christopher P. Schwartz
Assistant Examiner—Devon Kramer
(74) Attorney, Agent, or Firm—Morgan, Lewis & Bockius LLP

(57) ABSTRACT

A probe case attached to a back plate includes a first elastic locking piece for coupling with the back plate and a second elastic locking piece for fixedly positioning a probe. When the first elastic locking piece is attached to the back plate in a state of not mounting the probe, the first elastic locking piece is brought into a tacked state of being coupled to the back plate attachably and detachably. Further, when the probe is mounted in the tacked state, elastic deformation of the first elastic locking piece is restricted by the probe to thereby bring about a locking state in which the probe case cannot be detached from the back plate. The second elastic locking piece includes a release operating portion for causing elastic deformation for disengaging engagement with the probe.

9 Claims, 4 Drawing Sheets

BRAKE PAD WEAR DETECTING APPARATUS

BACKGROUND OF THE INVENTION

1. Field of the Invention

The present invention relates to a brake pad wear detecting apparatus, in details, to a brake pad wear detecting apparatus having a probe case attached to a back plate and a probe fixedly positioned to a predetermined position relative to a lining by being mounted to the probe case for detecting wear of a brake pad and outputting a constant wear detecting signal by bringing a rotating member into contact with a front end of the probe when a wear amount of the lining reaches a predetermined value.

2. Description of the Related Art

There has been proposed a brake pad wear detecting apparatus mounted to a brake apparatus of a vehicle, outputting a constant wear detecting signal when a wear amount of a lining of a brake pad reaches a predetermined value and outputting an alarm urging replacement of the brake pad before the wear amount of the lining exceeds a limit.

FIG. 7 through FIG. 9 show a conventional example of such a brake pad wear detecting apparatus.

A brake pad wear detecting apparatus 10 shown here is disclosed in Japanese Utility Model Publication No. 42665/1983. The brake pad wear detecting apparatus 10 is provided with a probe case 6 attached to a back plate 4 fixedly mounted to a back face of a lining 3 of the brake pad 1. A probe 8 is fixedly positioned to a predetermined position relative to the lining 3 by mounting to the probe case 6 for detecting wear. The brake pad wear detecting apparatus 10 outputs a constant wear detecting signal by bringing a rotating member (disc rotor), not illustrated, into contact with a front end 8a of the probe 8 when a wear amount of the lining 3 reaches a predetermined value by being brought into contact with the rotating member.

The brake pad 1 is constituted by the lining 3 pressed to a surface of the rotating member for generating predetermined frictional force and the back plate 4 fabricated by a metal plate fixedly mounted to the back face side of the lining 3 for functioning as an attachment metal piece for a support member on the vehicle body side. The brake pad 1 is supported to be able to press the rotating member by hanging ear portions thereof formed to project at both side portions of the back plate 4 by a pad guide portion of a support member on the vehicle body side, although not illustrated.

As shown by FIG. 8, the probe case 6 in the conventional brake pad wear detecting apparatus 10 is constructed by a constitution formed with a flange portion 6b having a diameter larger than that of an attaching hole 4a at a front end of a cylindrical portion 6a capable of being inserted into the attaching hole 4a formed at the back plate 4 and mounted with an elastic locking piece 6c projected to an inner side at a middle portion of the cylindrical portion 6a.

According to the probe case 6, the cylindrical portion 6a is inserted into the attaching hole 4a from the surface side of the back plate 4 before forming the lining 3 on the back plate 4 in a laminated state. The flange portion 6b is brought into a state of being in contact with the surface of the back plate 4 and thereafter, the lining 3 is formed on the surface of the back plate 4 in such a state to thereby sandwich the flange portion 6b by the lining 3 and the back plate 4 to fix to the back plate 4 as shown by FIG. 7.

The probe 8 is formed with faced portions 8c for engaging with the elastic locking pieces 6c at opposed positions of an outer periphery on a base end side of a main body 8b of a cylindrical shape. The probe 8 is inserted into the cylindrical portion 6a of the probe case 6, and when the main body 8b is inserted into the probe case 6 until a front end 8a thereof is brought into contact with a wear detecting position 3a of the lining 3, as shown by FIG. 7, the elastic locking pieces 6c are engaged with the faced portions 8c and fixed to the probe case 6.

Further, when the probe 8 is rotated relative to the probe case 6 in the state of being engaged with the probe case 6 as shown by FIG. 7, the elastic locking pieces 6c are pushed back by an outer peripheral face which is not faced. Then, engagement between the elastic locking pieces 6c and the faced portions 8c is disengaged and the probe 8 can be extracted from the probe case 6.

However, according to the above-described conventional brake pad wear detecting apparatus 10, since the probe case 6 is fixed to the back plate 4 in steps of fabricating the brake pad 1, there poses a problem that in the steps of fabricating the brake pad 1, it is necessary to integrate a mechanism of positioning the probe case 6 or the like and the steps of fabricating the brake pad 1 are complicated.

Further, since the probe case 6 is integrated to the brake pad 1, there also poses a problem that in replacing the brake pad, the probe case 6 cannot be utilized again.

Further, since the brake pad 1 is in a mode in which the probe case 6 is projected to the back face, the brake pads 1 cannot be stored to, overlap. Accordingly, a large store space is needed and at the same time, there is a concern that other article hits the probe case 6 in carrying the brake pad 1 and the probe case 6 is damaged. Further, there also poses a problem that the storing performance and handling performance are poor.

SUMMARY OF THE INVENTION

The present invention has been carried out in view of the above-described situation and it is an object thereof to provide a brake pad wear detecting apparatus in which steps of fabricating a brake pad is not complicated. Further, a probe case can be simply attached to and detached from a back plate; therefore, when the brake pad is replaced, the probe case can be simply removed from a used brake pad and utilized again. Further, in storing or carrying the brake pad, by bringing the probe case into a state of being removed from the brake pad, a number of pieces of the brake pads can be stored or carried in a laminated state to thereby enable to promote performance of storing the brake pad and performance of handling thereof.

In order to achieve the above-described object, according to the present invention, there is provided a brake pad wear detecting apparatus including a probe case attached to a back plate and a probe mounted to the probe case and fixedly positioned to a predetermined position relative to a lining for detecting wear of a brake pad and outputting a wear detecting signal when a wear amount of the lining reaches a predetermined value, wherein the probe case includes a first elastic locking piece achieving coupling with the back plate and a second elastic locking piece for fixedly positioning the probe, and wherein the first elastic locking piece is constructed so that when the probe case is attached to the back plate in a state of not mounting the probe, the first elastic locking piece is brought into a tacked state of being coupled to the back plate by elastic deformation and when the probe is mounted to the probe case in the tacked state, the elastic deformation of the first elastic locking piece is restricted by the probe and the probe case is brought into a locked state in which the probe case cannot be detached from the back plate, and wherein the second elastic locking piece includes a release operating portion for disengaging engagement with the probe.

Further, according to the brake pad wear detecting apparatus having the above-described constitution, when the engagement between the second elastic locking piece and the probe is disengaged by operating the release operating portion of the probe case, the probe can be detached from the probe case. Further, the probe case in the state of not mounting the probe by detaching the probe is brought into the tacked state capable of releasing engagement of the first elastic locking piece for coupling the probe case and the back plate, while the back plate and the probe case can be simply detached from the back plate.

That is, according to the above-described brake pad wear detecting apparatus, the probe case is not integrated to the brake pad, and the probe case and the probe can be simply attached to and detached from the brake pad, if necessary.

Therefore, it is not necessary to incorporate a step of attaching the probe case for fabricating the brake pad. Further, when the probe case is stored or carried, the probe case can be kept in a state of being detached from the brake pad, and when the brake pad is replaced, the probe case can be detached from the used brake pad and utilized again.

DETAILED DESCRIPTION OF THE PREFERRED EMBODIMENTS

A detailed explanation will be given of preferable embodiments of a brake pad wear detecting apparatus according to the present invention in reference to the drawings.

Figure 1:
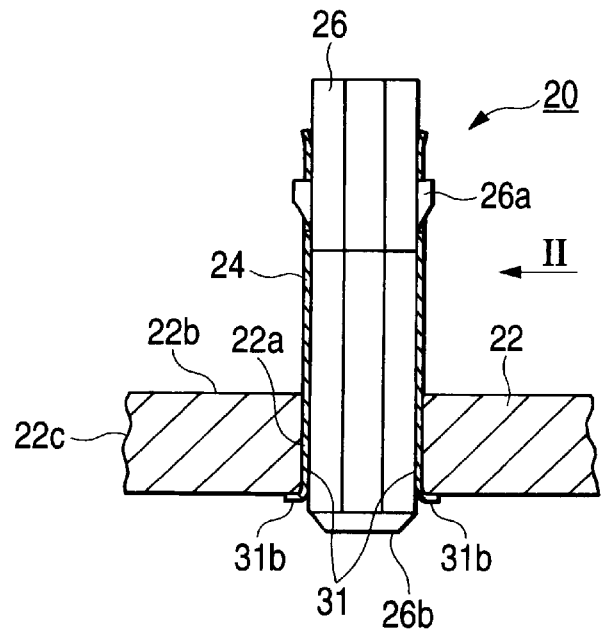
FIG. 1 is a vertical sectional view of an assembled state of an embodiment of a brake pad wear detecting apparatus according to the present invention.
Figure 2:
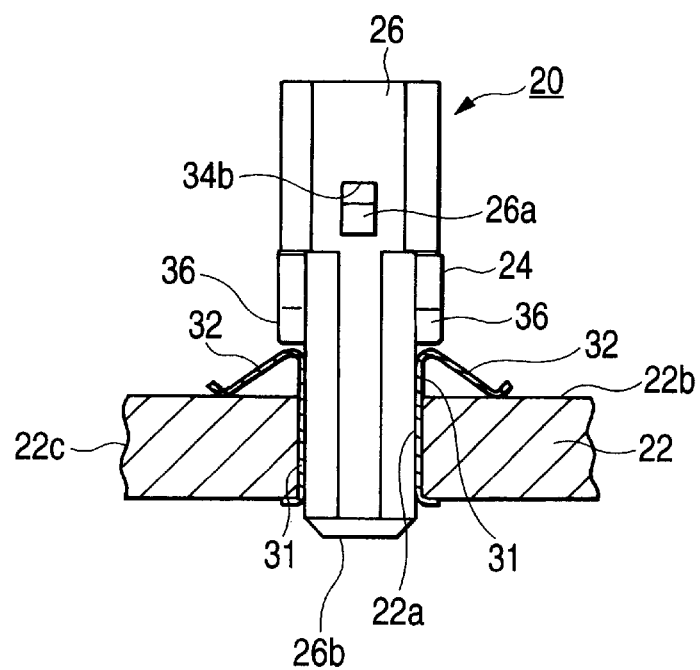
FIG. 2 is a view of FIG. 1 from the direction of an arrow II.
Figure 3:
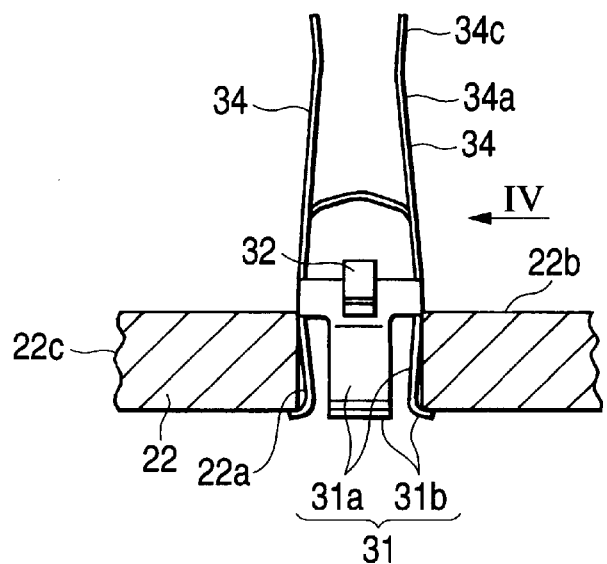
FIG. 3 is a vertical sectional view showing a state of assembling only a probe case of the brake pad wear detecting apparatus of FIG. 1 into a back plate.
Figure 4:
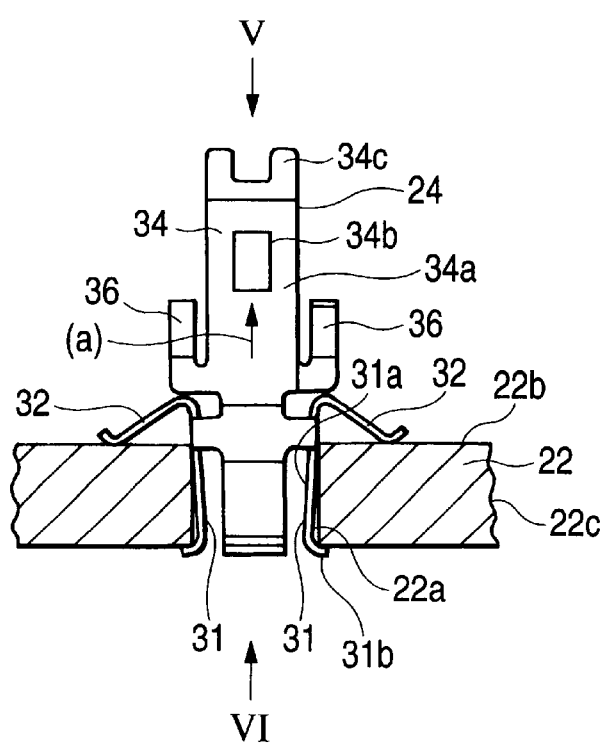
FIG. 4 is a view of FIG. 3 from the direction of an arrow IV.
Figure 5:
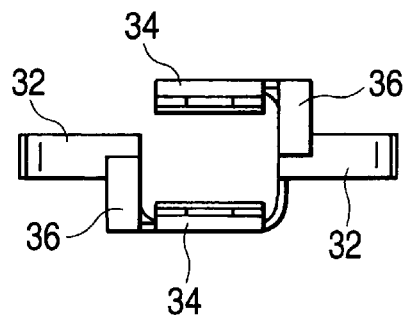
FIG. 5 is a view of FIG. 4 from the direction of an arrow V.
Figure 6:
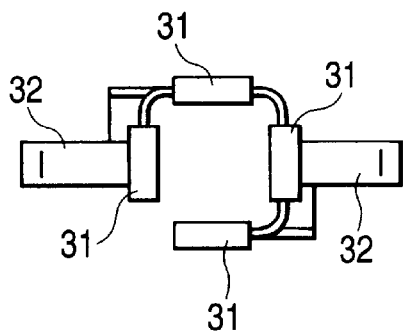
FIG. 6 is a view of FIG. 4 from the direction of an arrow IV.
Figure 7:
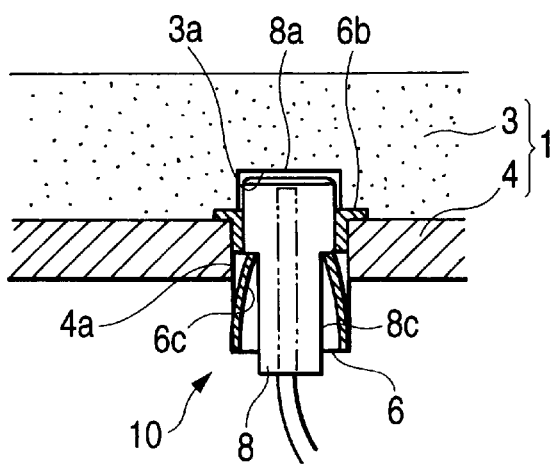
FIG. 7 is a vertical sectional view showing a structure of a conventional brake pad wear detecting apparatus.
Figure 8:
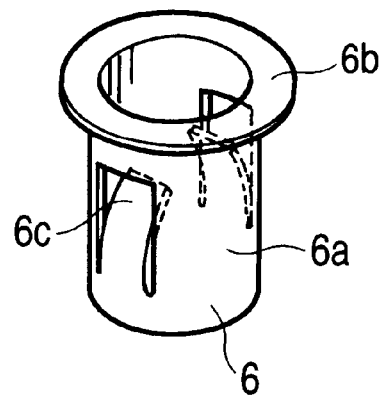
FIG. 8 is a perspective view of a probe case shown in FIG. 7.
Figure 9:
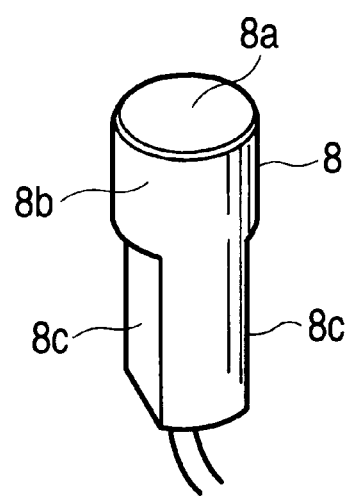
FIG. 9 is a perspective view of a probe shown in FIG. 7.

FIG. 1 through FIG. 6 show an embodiment of a brake pad wear detecting apparatus according to the present invention. FIG. 1 is a vertical sectional view of a state of assembling the brake pad wear detecting apparatus according to the embodiment of the present invention. FIG. 2 is a view of FIG. 1 from the direction of an arrow II. FIG. 3 is a vertical sectional view showing a state of assembling a single member of a probe case of the brake pad wear detecting apparatus of FIG. 1 to a back plate. FIG. 4 is a view of FIG. 3 from the direction of an arrow IV. FIG. 5 is a view of FIG. 4 from the direction of an arrow V, and FIG. 6 is a view of FIG. 4 from the direction of an arrow VI.

A brake pad wear detecting apparatus 20 according to the embodiment is mounted to a brake pad of a disc brake. The brake pad wear detecting apparatus 20 is provided with a probe case 24 attached to a back plate 22 fixedly mounted to a back face of a lining of the brake pad. A probe 26 is fixedly positioned to a predetermined position relative to the lining by being mounted to the probe case 24 for detecting wear of the brake pad. The brake pad wear detecting apparatus 20 outputs a constant wear detecting signal when a wear amount of the lining of the brake pad reaches a predetermined value by being brought into contact with a rotor.

In this embodiment, the probe case 24 includes four pieces of first elastic locking pieces 31, two pieces of positioning pieces 32, two pieces of second elastic locking pieces 34, and a pair of handling portions 36. the probe case 24 is constructed by press-forming a metal plate with integrally forming the pieces 31, 32, 34 and the handling portions 36. The four pieces of the first elastic locking pieces 31 are inserted into an attaching hole 22a of a square shape penetrating the back plate 22. The two pieces of the positioning pieces 32 are brought into contact with a back face (top face in the drawing) 22b of the back plate 22 for restricting a length of inserting the first elastic locking pieces 31 into the attaching hole 22a. The two pieces of the second elastic locking pieces 34 are for fixedly positioning the probe 26. The pair of the handling portions 36 is for restricting the depth of inserting the probe 26 along with the second elastic locking pieces 34 and is constituting grasp portions for attaching to and detaching from the attaching hole 22a.

Further, in this embodiment, a position of installing the attaching hole 22a in the back plate 22 is disposed at ear portions 22c installed to both sides of the back plate 22 for hanging the back plate 22 by a support portion on the vehicle body side.

Still further, although not illustrated, a lining is fixedly mounted to an area of a surface of the back plate 22 (lower face in FIG. 2) which does not include the ear portion 22c (that is, the surface of the back plate 22 is brought into contact with the back face of the lining).

The four pieces of the first elastic locking pieces 31 are arranged to be opposed to each other to form a square cylinder for inserting the probe 26. Further, as shown by FIG. 3 and FIG. 4, each of the first elastic locking pieces 31 is constructed by a structure including a locking claw 31b. The locking claw 31b are caught by an end edge of an outlet of the attaching hole 22a and provided at a front end of a plate spring portion 31a extended along substantially an axial direction of the attaching hole 22a. Accordingly, the first elastic locking pieces 31 are coupled to the back plate 22 by engaging the locking claw 31b with the end edge of the outlet of the attaching hole 22a to thereby bring about a state of sandwiching the back plate 22 by the positioning pieces 32 and the locking claws 31b.

Further, in this embodiment, the positioning piece 32 is formed in a shape of a plate spring generating repulsive force when the positioning piece 32 is pressed by the back face of the back plate 22.

As shown by FIG. 4, the handling portions 36 are arranged to be opposed to each other substantially on a diametrical line of the square cylinder constituted by four pieces of the first elastic locking pieces 31. When in a state of not mounting the probe 26, the opposed handling portions 36 are grasped to urge in directions of approaching each other, the pair of the first elastic locking pieces 31 opposed to each other in a direction the same as that of the respective handling portions 36 are bent inwardly to enable to reduce operational force in attaching to and detaching from the probe case the attaching hole 22a.

As shown by FIG. 3 and FIG. 4, when the above-described first elastic locking pieces 31 are attached to the back plate 22 in a state in which the probe 26 is not mounted, there is brought about a tacked state in which coupling with the back plate 22 by the first elastic locking pieces 31 can be released. In the tacked state, when the pair of handling portion 36 are grasped and predetermined force or larger is exerted in a drawing direction (the direction of arrow (a) in FIG. 4), the respective first elastic locking pieces 31 are elastically deformed in a direction of releasing engagement with the end edge of the outlet of the attaching hole 22a and can be detached from the back plate 22.

Further, when the probe 26 is mounted to the probe case 24 in the state of being tacked to the back plate 22, as shown by FIG. 1 and FIG. 2, by bringing an outer peripheral face of the probe 26 into contact with inner faces of the respective first elastic locking pieces 31, inward elastic deformation of the respective first elastic locking pieces 31 is restricted by the probe 26 and the probe case 24 is brought into a locked state in which the probe case 24 cannot be detached from the back plate 22.

Each of the second elastic locking pieces 34 includes a locking hole 34b for locking the probe 26 by being engaged with a projection 26a projected at an outer periphery of the probe 26. The locking hole 34b is provided on a plate spring portion 34a disposed along the outer peripheral face of the probe 26, and by engagement between the projection 26a and the locking hole 34b, a front end 26b of the probe 26 is fixedly positioned at a wear detecting position of the lining 3.

In this embodiment, a front end of each of the second elastic locking pieces 34 is integrally formed with a release operating portion 34c for causing elastic deformation for disengaging engagement with the probe 26.

According to the above-described brake pad wear detecting apparatus 20, as shown by FIG. 1 and FIG. 2, in a state of being assembled to a brake pad, when engagement between the second elastic locking pieces 34 and projections 26a of the probe 26 are disengaged by operating the release operating portion 34c of the probe case 24, the probe 26 can be detached from the probe case 24.

Further, as shown by FIG. 3 and FIG. 4, when the probe 26 is not mounted into the probe case 24, the probe case 24 can be in a tacked state in which the first elastic locking pieces 31 for coupling the probe case 24 and the back plate 22 can be released from being engaged with the back plate 22. Accordingly, the probe case 24 can be simply detached from the back plate 22.

That is, according to the above-described brake pad wear detecting apparatus 20, the probe case 24 is not integrated to the brake pad; therefore, the probe case 24 and the probe 26 can be simply attached to and detached from the brake pad, if necessary.

Therefore, it is not necessary to fix the probe case 24 as in the conventional brake pad wear detecting apparatus when the brake pad is fabricated. Accordingly, attachment of the probe case 24 does not complicate the steps of fabricating the brake pad.

Further, the probe case 24 can be simply attached to and detached from the back plate 22 of the brake pad; therefore, when the brake pad is replaced, the probe case 24 can be simply detached from the used brake pad and utilized again. Accordingly, resources can be saved.

Further, when the brake pad is stored or carried, by removing the probe case 24 from the brake pad, a number of pieces of the brake pads can be stored and carried in a laminated state. Therefore, performance of storing the brake pad and performance of handling thereof can be improved.

Further, although the above-mentioned embodiment is a case of mounting the brake pad wear detecting apparatus to the brake pad of the disc brake apparatus, the brake pad wear detecting apparatus of the present invention is naturally applicable to detect wear of a brake shoe in a drum brake apparatus.

In this embodiment, the square hole 22a provided in the back plate 22 has a square shape, and according to the probe case 24 fitted thereto, four pieces of the first elastic locking pieces 31 are opposedly arranged in the square cylinder shape. Therefore, even when a rotation preventive structure is not particularly mounted, relative rotation between the back plate 22 and the probe case 24 can be prevented. Moreover, a direction of attaching the probe case 24 is unified; therefore, the brake pad wear detecting apparatus can be easily attached to and detached from the brake pad.

Further, with regard to numbers of the above-described first and second elastic locking pieces and a specific locking structure, the design can be changed pertinently within a range not deviated from the gist of the present invention.

According to the brake pad wear detecting apparatus of the present invention, in the state of being assembled to the brake pad, when the engagement between the second elastic locking pieces and the probe is disengaged by operating the release operating portion of the probe case, the probe can be detached from the probe case. Further, when the probe is not mounted to the probe case, that is the probe is detached from the probe case, the probe case can be in the tacked state in which the first elastic locking pieces for coupling the probe case with the back plate is disengaged from the back plate. Thereafter, the probe case can be also detached simply from the back plate.

That is, according to the brake pad wear detecting apparatus having the above-described constitution, the probe case is not integrated to the brake pad. Accordingly, the probe case and the probe can be easily attached to and detached from the brake pad, if necessary.

Therefore, it is not necessary to incorporate a step for fixing the probe case when the brake pad is fabricated, and attachment of the probe case does not complicate the steps of fabricating the brake pad.

Further, since the probe case can be simply attached to and detached from the brake pad, when the brake pad is replaced, the probe case can be removed from the used brake pad and utilized again. Therefore, resources can be saved.

Further, the brake pads can be stored or carried in the laminated state if the probe case is detached from the brake pad. Therefore, performance of storing the brake pad and performance of handling thereof can be improved.

What is claimed is:

1. A brake pad wear detecting apparatus for outputting a wear detecting signal when a wear amount of a lining of a brake pad reaches a predetermined value, said brake pad wear detecting apparatus comprising:

a probe case releasably securable to a back plate provided on the lining; and a probe mounted to said probe case and fixedly positioned to a predetermined position relative to the lining for detecting wear of the brake pad, wherein said probe case includes a first elastic locking piece for coupling with the back plate and a second elastic locking piece for fixedly positioning said probe, and wherein said probe case is attached to the back plate without mounting said probe and said probe case is removable from the back plate by elastic deformation of said first elastic locking piece, wherein when said probe is mounted to said probe case and said probe case is attached to the back plate, the elastic deformation of said first elastic locking piece is restricted by said probe, thereby preventing removal of said probe case from the back plate, and wherein said second elastic locking piece includes a release operating portion for disengaging engagement with said probe.

2. The brake pad wear detecting apparatus according to claim 1, wherein said probe case further includes two handling portions.

3. The brake pad wear detecting apparatus according to claim 2, wherein the two handling portions are arranged to be opposed to each other.

4. The brake pad wear detecting apparatus according to claim 1, wherein said first elastic locking piece forms a square cylinder.

5. A brake pad wear detecting apparatus for outputting a wear detecting signal when a wear amount of a lining of a brake pad reaches a predetermined value, said brake pad wear detecting apparatus comprising:

a probe case attached to a back plate provided on the lining; and a probe mounted to said probe case and fixedly positioned to a predetermined position relative to the lining for detecting wear of the brake pad, wherein said probe case includes a first elastic locking piece for coupling with the back plate and a second elastic locking piece for fixedly positioning said probe, wherein said probe case is attached to the back plate without mounting said probe, said first elastic locking piece is in a tacked state of being coupled to the back plate by elastic deformation, wherein when said probe is mounted to said probe case in the tacked state, the elastic deformation of said first elastic locking piece is restricted by said probe, and said probe case is in a locked state in which said probe case cannot be detached from the back plate, wherein said second elastic locking piece includes a release operating portion for disengaging engagement with said probe, and wherein said probe case further includes two handling portions arranged to be opposed to each other substantially on a diametrical line of a square cylinder constituted by four pieces of said first elastic locking pieces.

6. A brake pad wear detecting apparatus for outputting a wear detecting signal when a wear amount of a lining of a brake pad reaches a predetermined value, said brake pad wear detecting apparatus comprising:

a probe case attached to a back plate provided on the lining; and a probe mounted to said probe case and fixedly positioned to a predetermined position relative to the lining for detecting wear of the brake pad, wherein said probe case includes a first elastic locking piece for coupling with the back plate and a second elastic locking piece for fixedly positioning said probe, wherein said probe case is attached to the back plate without mounting said probe, said first elastic locking piece is in a tacked state of being coupled to the back plate by elastic deformation, wherein when said probe is mounted to said probe case in the tacked state, the elastic deformation of said first elastic locking piece is restricted by said probe, and said probe case is in a locked state in which said probe case cannot be detached from the back plate, wherein said second elastic locking piece includes a release operating portion for disengaging engagement with said probe, and wherein four pieces of said first elastic locking pieces are opposedly arranged in a square cylinder shape and fitted to a square hole provided in the back plate.

7. The brake pad wear detecting apparatus according to claim 6, wherein said probe case further includes two handling portions.

8. The brake pad wear detecting apparatus according to claim 7, wherein the two handling portions are arranged to be opposed to each other.

9. The brake pad wear detecting apparatus according to claim 6, wherein said probe case forms a square cylinder.

* * * * *